US012710980B2

(12) United States Patent
Chernobrivenko et al.

(10) Patent No.: US 12,710,980 B2
(45) Date of Patent: Aug. 18, 2026

(54) TERMINATION OF SIDECAR CONTAINERS

(71) Applicant: MICROSOFT TECHNOLOGY LICENSING, LLC, Redmond, WA (US)

(72) Inventors: Sergey Chernobrivenko, Welling (GB); Alex John Hockey, London (GB)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 725 days.

(21) Appl. No.: 18/074,423

(22) Filed: Dec. 2, 2022

(65) Prior Publication Data

US 2024/0111579 A1 Apr. 4, 2024

(30) Foreign Application Priority Data

Oct. 3, 2022 (GB) ..................................... 2214493

(51) Int. Cl.
*G06F 9/48* (2006.01)
*G06F 18/2321* (2023.01)

(52) U.S. Cl.
CPC ........ *G06F 9/4881* (2013.01); *G06F 18/2321* (2023.01)

(58) Field of Classification Search
CPC .......................... G06F 9/4881; G06F 18/2321
See application file for complete search history.

(56) References Cited

U.S. PATENT DOCUMENTS 7,386,615 B1 * 6/2008 Surlaker ............... G06F 9/5011 714/48
9,985,873 B1 * 5/2018 Don .................... H04L 67/1097
10,121,021 B1 * 11/2018 Fonseka .............. G06F 21/6218
11,429,465 B1 * 8/2022 Baid ..................... G06F 9/5072
2020/0117468 A1 * 4/2020 Flynn ...................... G06F 9/442
2021/0011762 A1 * 1/2021 Lin .......................... G06N 3/08
2022/0012373 A1 * 1/2022 Kulkarni ............... G06F 21/602
2022/0021953 A1 * 1/2022 Moser ..................... G06F 1/203
2023/0006889 A1 * 1/2023 Thyagaturu ......... H04L 41/5054
2023/0028469 A1 * 1/2023 Chishima .................. G06F 1/26
2023/0047880 A1 * 2/2023 Lenrow ................... H04L 63/20

(Continued)

FOREIGN PATENT DOCUMENTS

CN 114816662 A 7/2022

OTHER PUBLICATIONS

CN 114816662 Machine Translation.*

(Continued)

*Primary Examiner* — Peng Ke
(74) *Attorney, Agent, or Firm* — Han Gim; Newport IP, LLC

(57) ABSTRACT

In various examples there is a method performed by a controller in Kubernetes cluster. The method comprises: identifying a job to be completed by the cluster, from a plurality of jobs. In response to identifying a job to be completed by the cluster, determining at least one sidecar container associated with the job. In response to identifying a job to be completed by the cluster, determining that the job has been completed by querying a Kubernetes control plane of the cluster. In response to determining that the job has been completed, triggering termination of the sidecar container.

20 Claims, 5 Drawing Sheets

(56) References Cited

U.S. PATENT DOCUMENTS

| | | | | |
|---|---|---|---|---|
| 2023/0179417 | A1* | 6/2023 | James | H04L 63/10<br>713/168 |
| 2023/0244522 | A1* | 8/2023 | Chandrasekaran | G06F 3/061<br>718/103 |

OTHER PUBLICATIONS

International Preliminary Report on Patentability received for PCT Application No. PCT/US23/031320, mailed on Apr. 17, 2025, 08 Pages.

Ajbouh: "k8s-watchdog.yaml", Retrieved from: https://gist.github.com/ajbouh/79b3eb4833aa7b068de640c19060d126, Dec. 12, 2017, pp. 1-13.

"Better Support for Sidecar Containers in Batch Jobs", Retrieved from: https://github.com/kubernetes/kubernetes/issues/25908, Aug. 18, 2021, pp. 1-41.

Mitchinson, et al., "Anonymous: GitHub—nrmitchi/k8s-controller-sidecars", Retrieved from: https://github.com/nrmitchi/k8s-controller-sidecars, Nov. 18, 2021, 3 Pages.

"International Search Report and Written Opinion issued in PCT Application No. PCT/US2023/031320", Mailed Date: Oct. 13, 2023, 12 Pages.

Sereg, Marton, "Sidecar container lifecycle changes in Kubernetes 1.18", Retrieved From: https://banzaicloud.com/blog/k8s-sidecars/, Feb. 4, 2020, pp. 1-10.

* cited by examiner

TERMINATION OF SIDECAR CONTAINERS

CROSS-REFERENCE TO RELATED APPLICATION(S)

This non-provisional utility application claims priority to GB patent application number 2214493.5 entitled "TERMINATION OF SIDECAR CONTAINERS" and filed on Oct. 3, 2022, which is incorporated herein in its entirety by reference.

BACKGROUND

In modem containerized computer networks, a plurality of virtualized network functions (VNFs) are deployed in containers, each of which ideally performs a single function, or job. Containers deliver a variety of functions such as storage, databases, networking functions, software, analytics, and intelligence over the Internet and/or other communications networks. Some functions are complex enough to require additional supporting functions which relate to, but are distinct from, the primary function. To simplify the network, each container ideally delivers only a single function. Therefore, subsidiary functions are created in secondary containers connected to the primary containers, called "sidecar containers", or "sidecars". Sidecar containers perform a variety of supporting functions, such as setting up networking for the primary containers, providing logging of the primary containers, providing management of the primary container, and other functions to support the primary container.

Kubernetes (trade mark), also written as "K8s", is an industry-standard orchestrator for setting up modern containerized networks of VNFs, known as "clusters". Given the complexities of managing a containerized network related to setting up, monitoring, and tearing down the individual containers, as well as ensuring hardware resources are assigned to each of the containers, most networks that deploy containerized networks utilize an orchestrator to handle these day-to-day operations. Resources can then be focused on development and operational expertise on the functions delivered by the network.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

In various examples there is a method performed by a controller in Kubernetes cluster. The method comprises the steps of: identifying a job to be completed by the cluster, from a plurality of jobs. In response to identifying a job to be completed by the cluster, determining at least one sidecar container associated with the job. In response to identifying a job to be completed by the cluster, determining that the job has been completed by querying a Kubernetes control plane of the cluster. In response to determining that the job has been completed, triggering termination of the sidecar container.

By using a controller in a cluster, sidecar containers in the communications network cluster, are terminated in a safe and efficient manner. Kubernetes considers a job is done when the relevant containers have exited, whether they are sidecar containers or not.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

Figure 1:
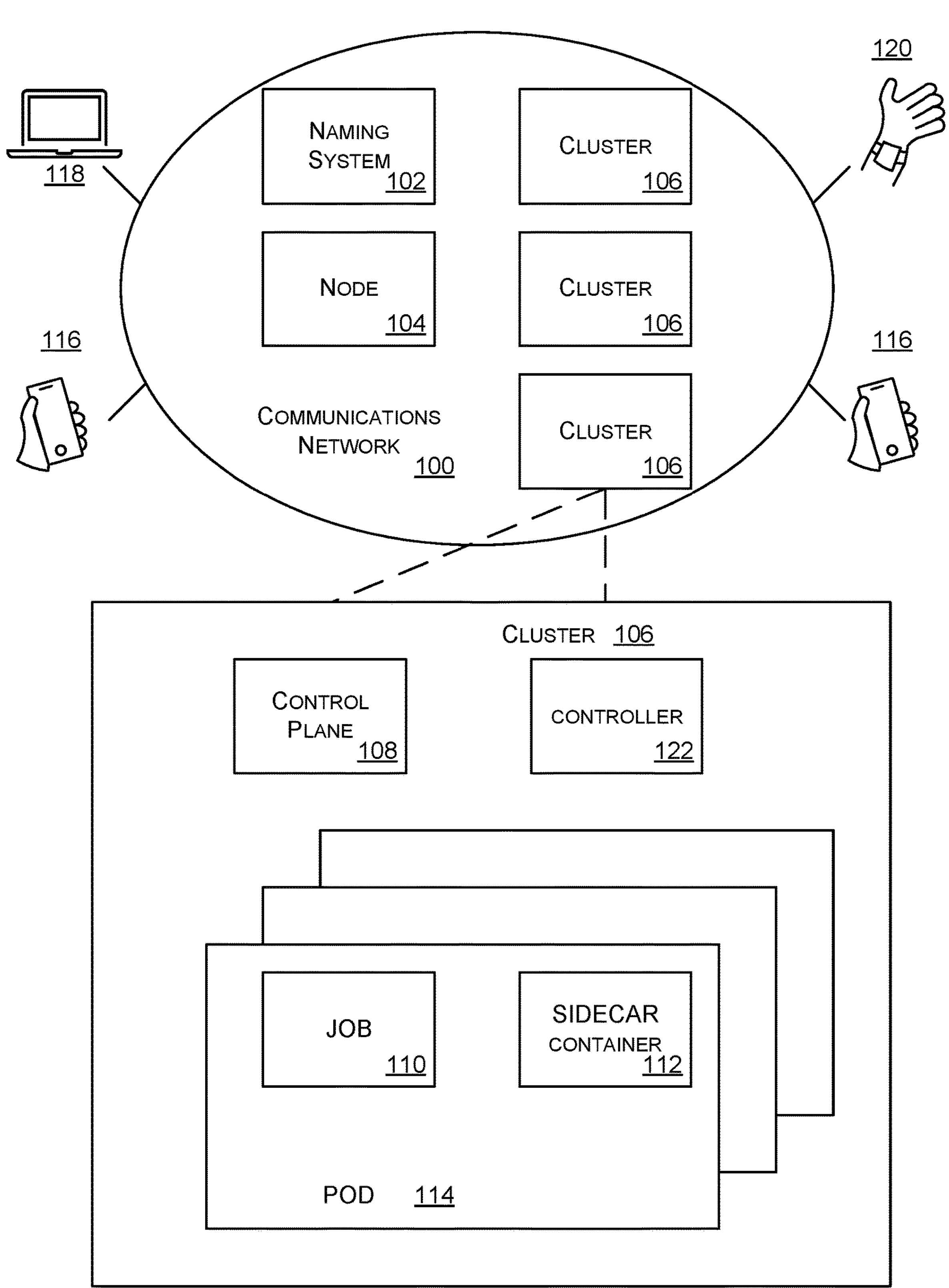
FIG. 1 is a schematic diagram of a communications network and a cluster within that network.

The detailed description provided below in connection with the appended drawings is intended as a description of the present examples and is not intended to represent the only forms in which the present examples are constructed or utilized. The description sets forth the functions of the examples and the sequence of operations for constructing and operating the examples. However, the same or equivalent functions and sequences may be accomplished by different examples.

A container is a unit of software comprising code and dependencies of the code (such as runtime, system tools, system libraries, settings) so that when a container is deployed everything needed to execute the software is available in the container. Typically, there is one container per function or job; that is a container implements a single function or job.

A sidecar container, also referred to as a sidecar, is a type of container which performs a job which is a supporting function for a primary container. Sidecar containers perform a variety of supporting functions, such as setting up networking for the primary container, providing logging of the primary container, providing management of the primary container, and other functions to support the primary container.

One issue with sidecar containers is that they often provide a supporting function that has no termination point. As a result a sidecar container will continue to execute indefinitely even after its associated primary container has completed. This is a significant problem as now explained.

Orchestrators comprise one or more elements forming a "control plane" which are accessed by administrators or computing elements within a network to perform management functions, and also proactively monitor for the completion of "jobs" when all containers in those jobs have exited to facilitate termination and cleanup. Since sidecar containers do not tend to exit, their existence poses a problem as they cause jobs to be considered ongoing even after the primary container has completed work. Other orchestrators, such as distributed cloud operating system (DC/OS), Docker Swarm (trade mark), and individually developed orchestration solutions, may be used as a valid alternative to Kubernetes, although sidecar containers do not tend to exit in these other orchestrators either.

One approach for addressing lack of sidecar termination comprises using additional containers. Additional containers deployed alongside primary containers monitor primary containers, and do additional cleanup (i.e. termination) of sidecars. This approach involves using more containers which is expensive and takes up resources.

Another approach is to rely on the primary containers cleaning up their own sidecars, which requires specific knowledge of both the container environment and the sidecars themselves to enable the primary containers to do this. This approach is complex and adds work for the primary containers.

Another approach is to have the sidecar container monitors the primary container for job completion and terminate itself when it detects the primary container ending. This approach is complex as the sidecar uses specific knowledge of both the container environment and the primary container's function.

Another approach is to use an architecture which breaks the "one container, one function" paradigm, and involves not using sidecars at all either going without the function, or incorporating it into the primary container.

The inventors have recognized that it is difficult to efficiently, effectively, and universally terminate sidecar containers when the job associated with the sidecar containers is complete. As jobs are frequently finite, they will complete and be terminated using the functionality offered by the orchestrator of a contrasted network, such as a Kubernetes (trade mark) control plane. Sidecar containers often provide functionality that is ongoing, and therefore does not complete. As the control plane uses completion to trigger termination, and the resulting freeing up of engaged computer resources, this means that the sidecar consumes these resources needlessly. Also, there might be some other resources waiting for completion of a job before starting their deployment or processing. The term "universally" refers to terminating all sidecar containers in a cluster which are associated with a particular job.

An alternative is jobs that are designed to not rely on sidecars, or to be aware of the containerized network and the actions to be taken to terminate their own sidecars, or sidecars can themselves be designed to monitor the containerized network and terminate themselves when the job with which they are associated ends, however this means that these often universal processes are designed specifically to interoperate, and makes adding sidecars after the initial development a time consuming process, requiring multiple updates and enhancements across the wider network.

The inventors have devised a centralized controller, running as a separate container, which determines at least one job running on a computer network, determines when the job has completed, and upon determining that the job has completed, determines any associated sidecar containers and terminates them.

In this disclosure, the word "job" is used to refer to the function provided by at least one primary container, which is assumed to be a function that will terminate so that associated computer hardware resources are freed up. The primary container is the container providing the function that is the primary reason the network is deployed, such as telephony connectivity in a communications network, or processing of data in a data network. It is possible, and expected, for a cluster of compute nodes in a communications network to have many primary containers.

Sidecar containers are any container that is associated with a primary container, providing functionality only for use by that primary container. Examples of this function include technical function, such as network routing, load balancing, or proxying; or it can be functionality related to the operation of the network such as logging, monitoring, or maintenance. In addition, sidecars can implement other administration functions such as the generation of billing reports, or presentation of resource usage. It is possible for a primary container to have zero, one, or multiple sidecar containers.

In the examples described herein Kubernetes (trade mark) is used, including a Kubernetes (trade mark) control plane, Kubernetes (trade mark) cluster, and Kubernetes (trade mark) orchestrator. However it is understood that any orchestrator that consists of a control plane to administer a containerized network, comprised of at least one cluster, which relies on job completion to free up resources, and provides an interface that has the function required to terminate the containers, may be used.

Containers which are related to each other in Kubernetes (trade mark) are deployed in "pods", which are logical constructions in a containerized network which correspond to an underlying group of storage, physical, or network resources. Pods, therefore, are usually used to group containers working on related functionality. Jobs are generally expected to be running in pods with their sidecars (that is, a pod typically comprises a job and a sidecar), though alternative configurations of multiple jobs running in a single pod, or in different pods, are possible. It will also be understood that if required, it is possible to deploy each container in a containerized network in a separate pod, if each function requires uncontested physical or network resources. It is also possible that pods are not used in any given containerized environment, and all resource is pooled via another method.

FIG. 1 is a is a schematic diagram of a communications network 100 such as a telecommunications network, the internet, or any other communications network 100. The telecommunications network is a fifth generation (5G) and/or sixth generation (6G) network in some cases. The communications network 100 comprises a plurality of nodes 104 such as routers, switches, firewalls or other nodes, as well as a plurality of clusters 106. Each cluster comprises a plurality of communications network nodes such as servers, switches, routers or other nodes. The nodes 104 and clusters 106 are interconnected by communications network links and so are the nodes within a cluster. The communications network optionally comprises a naming system 102 and end user devices such as smart phones 116, desk top computer 118, smart watch 120 are able to connect to the communications network 100.

One or more of the clusters 106 comprise containers implementing a service such as a voice mail service or other service. End user devices are able to use the service such as to create a voice mail or access a voice mail in the case the service is a voice mail service. Other types of service are also possible.

FIG. 1 has an expanded view of one of the clusters 106. In the cluster 106, an orchestrator is running, providing a control plane 108, and administering a plurality of pods 114. Each pod contains one or more containers such as for implementing one or more virtual network functions (VNF) of the communications network. At least one pod comprises a primary container running a job 110, and a sidecar container 112. In the example of FIG. 1 there is a plurality of pods 114 although in some examples there is only one pod 114.

The cluster 106 comprises a controller 122 which is a separate container within the cluster 106 (that is, the controller 122 is not in a pod 114 and has no sidecar container 112). The controller 122 is able to communicate with the control plane 108 of the cluster 106 and to communicate with one or more of the pods 114 of the cluster. The controller 122 is an element of the cluster 106 which performs operations to facilitate appropriate termination of sidecar containers as explained below. At least one of the clusters 106 has a controller 122. In some examples, all of the clusters 106 have a controller 122.

The controller 122 operates in an unconventional manner to provide a reliable and efficient method of terminating sidecar containers 122. Terminating sidecar containers 122 allows resources consumed by both sidecar containers 122 and a wider pod 114 to be freed up and returned to a cluster 106 for use on other processes, thus improving the function of the underlying computing device by allowing more efficient use of limited hardware resources. Also, any other resource which depends on the job completion is able to continue its processing or deployment.

Figure 2:
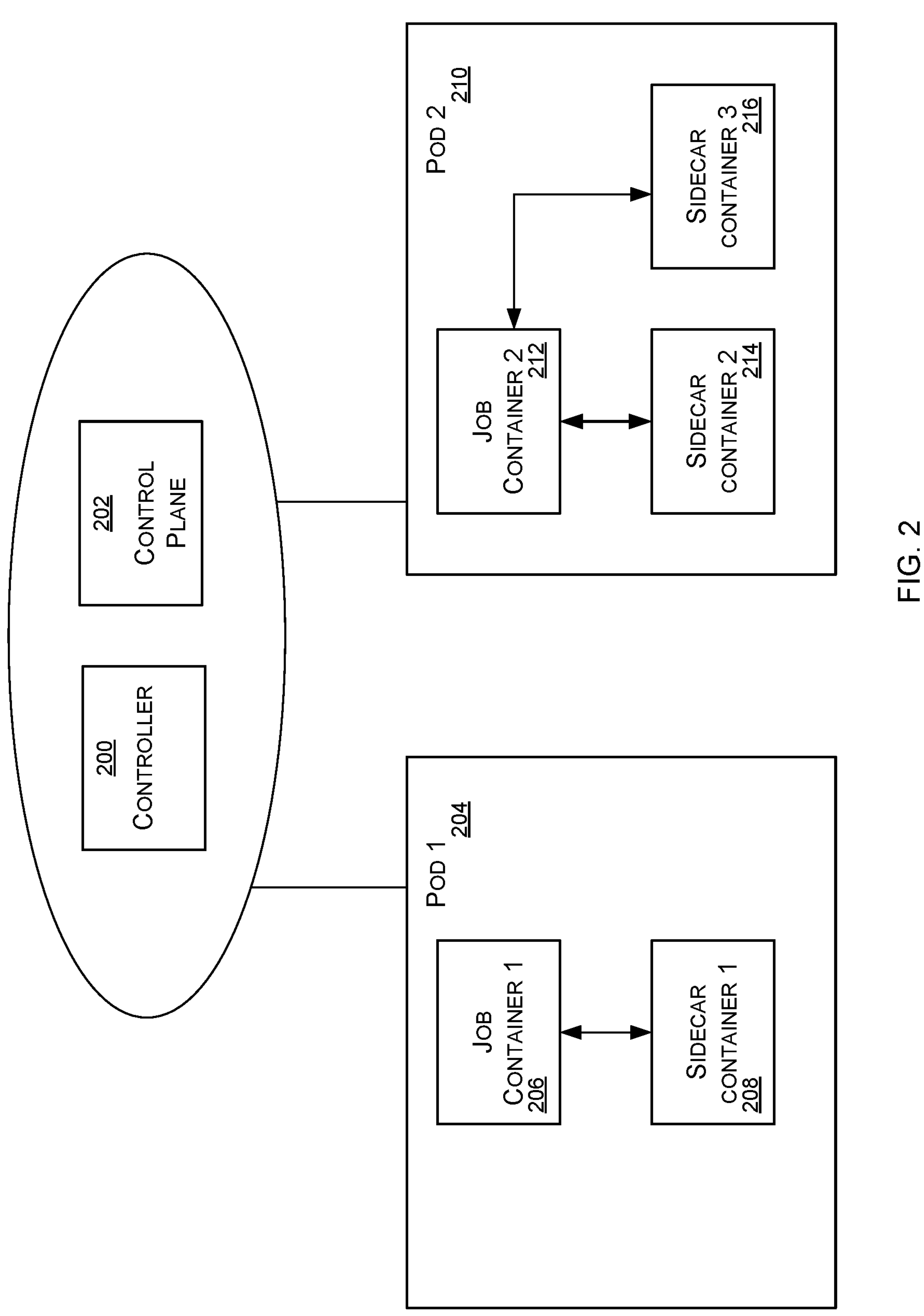
FIG. 2 is a schematic diagram of a single cluster, illustrating interconnections between several examples of jobs, sidecars, and a controller and control plane.

FIG. 2 is a schematic diagram of a single cluster 106 such as that of FIG. 1, illustrating interconnections between several examples of jobs, sidecar containers, and a controller and control plane. In the example of FIG. 2 the cluster 106 comprises a controller 200, a control plane 202 and two pods POD 1, 204 and POD 2, 210. POD 1, 204 comprises job container 1, 206 connected to sidecar container 1, 208. POD 2, 210 comprises job container 2, 212 connected to both sidecar container 2, 214 and sidecar container 3, 216.

The controller 200 is connected to the control plane 202, though which it identifies jobs and sidecars that are running in the cluster 106. Two pods are illustrated 204, 210 in order to illustrate possible relationships between a primary job container 206,212, and the associated sidecar containers 208, 214 and 216. Note the separation of the controller 200 from the job containers 206, 212, and the close association between job containers and the sidecar containers.

Figure 3:
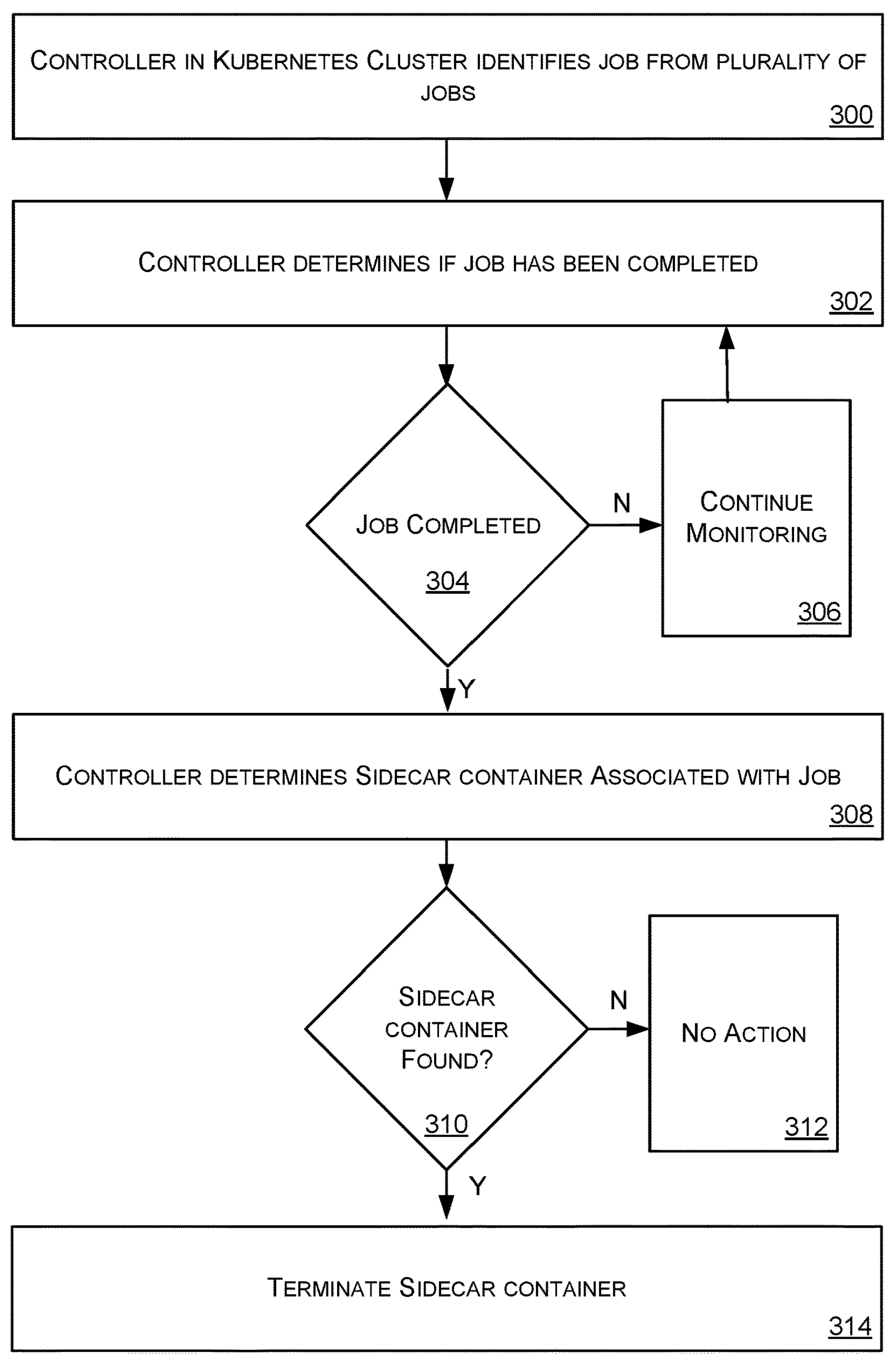
FIG. 3 is a flow diagram of a method performed by a controller.

FIG. 3 is a flow diagram of a method performed by a controller such as the controller 122 of FIG. 1 or the controller 200 of FIG. 2. The controller identifies 300 at least one job from a plurality of jobs running on a cluster where the controller is executing. The controller is running in a separate pod to any of the plurality of jobs.

Identifying a job means finding one or more of the pods in the cluster which are performing the job. In some examples the identifying 300 is done by querying the cluster control plane. The query includes one or more of: a portion of a pod's name where the pod is known to be performing the job, a label associated with a pod performing the job, or some other identifier associated with the job.

Alternatively, or in addition, the controller 200 is provided a configured list of relevant containers vis configuration loaded at start of day, or provided by an administrator.

In some cases, the operation of determining a job uses a parameter provided to the controller, and/or a preconfigured label on the pod, and/or a portion of an identifier of a pod, and/or a portion of an environmental variable of a pod. This allows pods to be targeted with the same name and labels by introducing different environment variables.

In some examples, the identifying 300 is done by identifying sidecar containers in the cluster and then using the information to determine relevant job containers. In some cases, the operation of determining the sidecar container associated with the job uses a portion of an identifier of the sidecar container.

Any of the methods of identifying a job from a plurality of jobs is combinable with any one or more of the other methods of identifying a job.

Having multiple methods to determine a list of job containers enables new jobs to be developed using simple methods of identifying them to a controller. Thus, the system is able to be dynamically developed or expanded during operation. By utilizing a programmatic identification method governed by identifiers that are configured by the control plane when setting up the containerized functions, or embedded in metadata in these containers accessible programmatically, this method permits dynamic operation and reconfiguration without complex programming to permit interoperation. The precise configuration or metadata is chosen to reflect the other needs of the network and functionality offered by specific control planes, and third-party software. In addition, these variable methods permit new sidecars to be added to existing jobs, even if those jobs are not under the control of the developer or administrator, provided this configuration or identification parameter is configured appropriately.

Once the relevant job or jobs have been determined, the controller determines 302 whether the job has been completed. This is done by querying the control plane 202 to obtain the present status of the container of the job. As mentioned above, job containers terminate on completion, and therefore the control plane is able to determine whether a job has been completed or whether a container of a job is still running. If the container is queried directly, then a failure to connect, indicating it has terminated, achieves the same result, as will a container that remains able to respond with a current status indicating completion. By utilizing the function offered by the control plane, as well as the containers themselves, the controller does not require the jobs themselves to perform any actions and is resilient to failures, where jobs exit improperly. By querying the control plane, the controller determines that a sidecar has failed to be terminated.

At decision point 304, the controller interprets the data. If the job is still running, then the controller continues to monitor 306, and runs through the operation 302 again. In FIG. 3, it is assumed that the controller maintains a list of identified containers and thus loops here, however as will be understood, certain implementations will benefit from the ability to regenerate the list regularly to ensure that new jobs are detected and monitored, which entails returning to the initial operation 300. By allowing these alternative methods to determine sidecars, it is possible for sidecar containers to be added to an existing and operational cluster easily and quickly without complex engineering work.

If the job has completed, then the controller determines 308 the related sidecars. The controller determines 308 the related sidecars using any of the methods for identifying the original jobs detailed above, or using a provided specific configuration detailing connections between the jobs and their sidecar containers. If there is no sidecar container associated with the job, then the controller has no action to perform 312. If there is a sidecar container, then the controller terminates this sidecar container 314.

In some cases the operation of determining a sidecar container associated with a job uses a portion of an environmental variable of a sidecar container. This is an efficient and effective way to determine a sidecar container.

In various examples, using the controller enables virtual network functions (VNFs) to be developed and deployed without primary containers of the VNFs needing to reference to their sidecar containers or sidecar containers needing to reference to their primary containers and neither referencing an underlying containerized environment in general. Using the controller permits more efficient use of computational resources across a cluster by making use of an orchestrator control plane already in existence, rather than duplicating the monitoring and termination effort across multiple VNFs.

Figure 4:
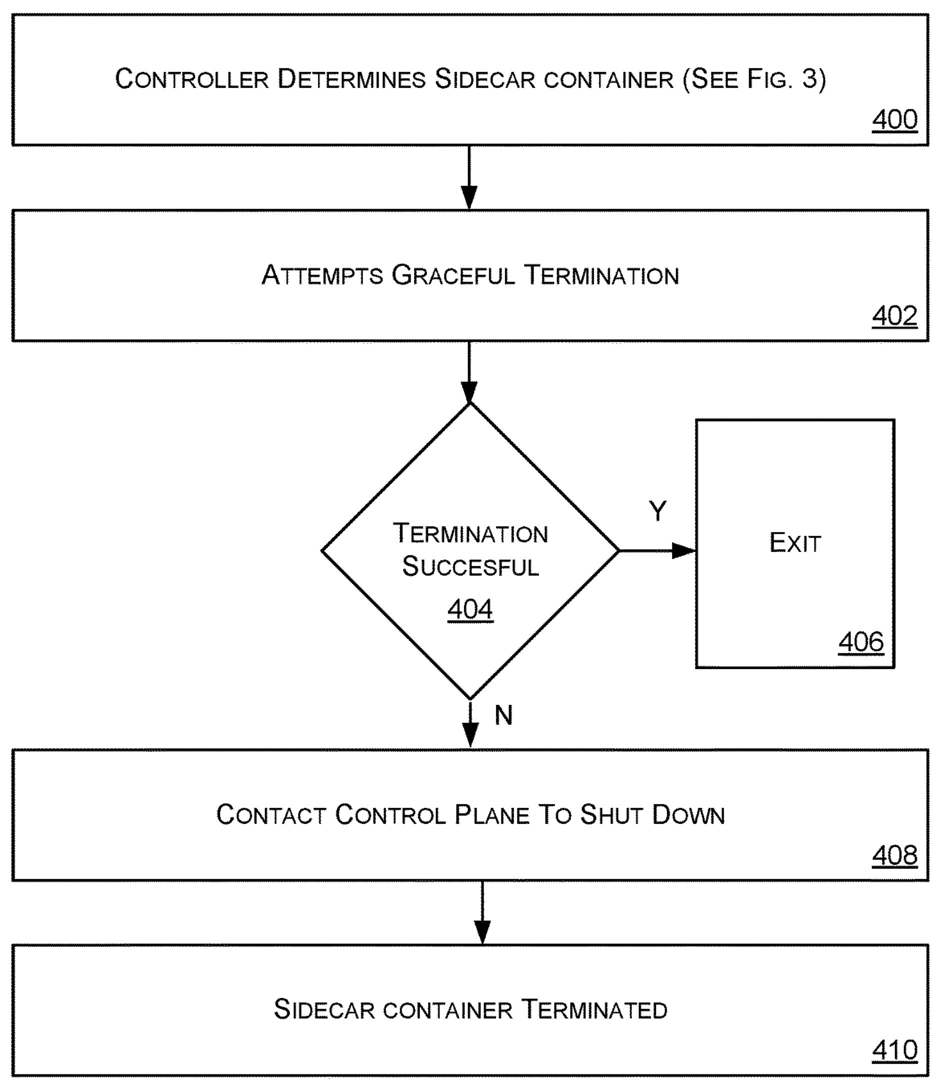
FIG. 4 is a flow diagram of a termination operation optionally performed by a controller.

FIG. 4 is a flow diagram of a termination operation optionally performed by a controller. FIG. 4 goes into more detail as to how the termination operation 314 of FIG. 3 is to implemented in some examples. The controller determines at least one sidecar container to be terminated 400, as described with reference to FIG. 3. The controller then connects to the sidecar container to be terminated and attempts a graceful termination of the sidecar container by directly instructing the sidecar container. Several classes of sidecar container benefit from a graceful termination procedure to ensure they complete their function reliably. If the sidecar container is a member of one of these classes the controller is able to successfully instruct the sidecar container to terminate and the termination happens in a graceful manner. In various examples of graceful termination of a sidecar container, a logging system writes to disk so as to avoid losing data in dynamic memory of the sidecar container. In another example of graceful termination of a sidecar container, a networking function in the sidecar container gracefully terminates connections to the sidecar container. This prevents other network functions having to detect a connection failure to the sidecar container. In another example, an administrative function in a sidecar container saves last known state for future reference. In some examples the graceful termination sequence is a generic set of operating-system level commands to end a sidecar container process. For example, a set of commands are implemented across multiple products offered by a single provider, or a combination of these and other common exit commands. The methods of identifying containers outlined above may be employed to specify methods to be attempted.

In order to access the sidecar container and trigger termination, the controller is able to use one of more methods such as: directly connecting to a known network address of the sidecar container, connecting utilizing configuration provided by a system administrator, utilizing any method to trigger various commands on the sidecar container, or using a network tunnel to connect directly to the sidecar container in question. Other methods may be used depending on the nature of the containerized network setup.

The controller then determines 404 if termination was successful or not. This is done by any one or more of: a sidecar container termination procedure notifying the controller, by the sidecar container providing a successful response code to one of the commands executed in the graceful termination operation 402, or by one of the methods detailed above to determine if a container is running on the cluster. If the sidecar container has terminated, the controller has completed the operation and the process moves to the exit operation 406. If the controller determines the sidecar container has not terminated, then the controller contacts 408 the control plane to terminate the sidecar container. As the control plane can be assumed to terminate any container running on the cluster, this operation 408 is expected to succeed.

The method of FIG. 4 enables the controller to be utilized with a variety of sidecar containers and which use termination gracefully if possible, with the benefits outlined above, or terminated through the control plane. Reliable termination is ensured.

By placing the controller in a separate container in the cluster which has access to the control plane, the controller does not presuppose or rely on specific behaviors that require the sidecar containers to act in a certain way. As will be understood, either operation 402 or 408 may be employed in isolation, and the controller configured to attempt only one or the other. In various examples where a communications network is not utilizing any sidecar containers which require graceful shutdown, the controller may be designed to only employ the termination via the control plane (i.e operation 408 but not operation 402). In additional examples, other methods of termination are employed as offered by the specific sidecar containers employed in a cluster, such as proprietary exit methods or other methods defined by the sidecar container functionality employed. Depending on configuration, multiple methods may be utilized across the containerized network with only the controller configuration or programming limiting which are employed.

As will also be understood, a further feature is that the functionality detailed in FIG. 4 is able to be changed dynamically once the cluster is operational by either replacing the controller, or by configuration of the controller, without requiring the sidecar containers or jobs to be changed in any way.

Alternatively, or in addition, the functionality of the controller described herein is performed, at least in part, by one or more hardware logic components. For example, and without limitation, illustrative types of hardware logic components that are optionally used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Graphics Processing Units (GPUs).

The controller has a technical effect on a process which is carried on outside the computer. Reliable termination of sidecar containers allows the underlying cluster to operate more efficiently, by removing excess and unnecessary overhead from the cluster allowing both more efficient use of computational power, and for the cluster to run more pods and thus offer more functionality. In various example communications networks, this allows for faster connections to be established, and for more endpoints and a more complex network to be supported without additional hardware being deployed. This also means the computer network runs more efficiently and effectively than a system without this functionality. Furthermore, the method described solves a more generic technical problem in that it allows networks to be deployed using third-party functions which cannot be altered during normal operation, which would be required to implement other solutions to this sidecar container termination problem, permitting different function to be offered by a containerized network.

The problem is overcome by the claimed method as opposed to merely being circumvented. As stated, the problem is how to terminate sidecar processes which do not terminate naturally without requiring rearchitecting or complex development work that is impossible or impractical depending on the access available to this components. As a direct result of the controller, the sidecar container processes are terminated and this does not simply circumvent the problem by deprioritizing or omitting the process. This permits these processes to be used without needlessly and inefficiently using computer resource.

In various examples, the method of FIGS. 3 and 4 is deployed on a Kubernetes (trade mark) cluster. In these examples, the control plane 108 is a Kubernetes (trade mark) control plane, the cluster 106 is a Kubernetes (trade mark) cluster, and the termination procedure detailed in FIG. 4 utilizes the Kubernetes (trade mark) application programming interface (API) to terminate the container 408 after the graceful termination fails 404.

In various examples, as the controller is part of a containerized communications network. Any containerized communications network is able to benefit from the methods of FIGS. 3 and 4 with minimal changes. Examples of other networks that may utilize jobs and sidecar container networks as described herein are streaming service networks, gaming networks, and data processing networks. In these cases, the elements of the network 102, 104 in FIG. 1 would change, as would the end user devices 118, 120, 116 such as external endpoints however the clusters 106 and functionality described above does not.

Figure 5:
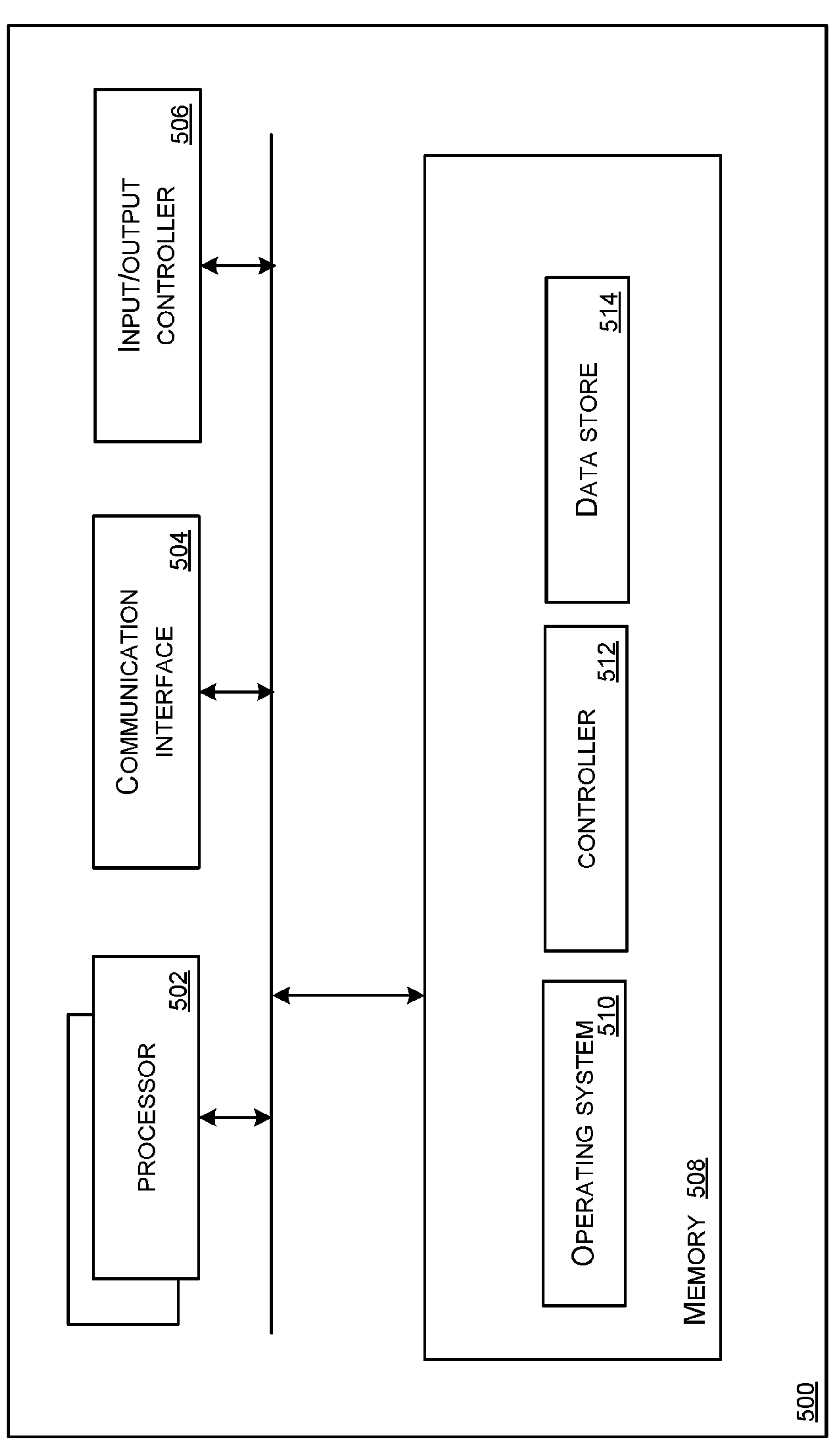
FIG. 5 illustrates an exemplary computing-based device in which embodiments of a controller for terminating sidecars is implemented.

FIG. 5 illustrates various components of an exemplary computing-based device 500 which is implemented as any form of a computing and/or electronic device, and in which embodiments of a controller are implemented in some examples.

Computing-based device 500 comprises one or more processors 502 which are microprocessors, controllers or any other suitable type of processors for processing computer executable instructions to control the operation of the device in order to identify sidecar containers of a job and terminate the identified sidecar containers. In some examples, for example where a system on a chip architecture is used, the processors 502 include one or more fixed function blocks (also referred to as accelerators) which implement a part of the method of any of FIGS. 3 and 4 in hardware (rather than software or firmware). Platform software comprising an operating system 510 or any other suitable platform software is provided at the computing-based device to enable application software to be executed on the device. Controller 512 is a container installed at the computing-based device. Data store 514 at the computing-based device stores information about jobs, information about sidecar containers and other data.

The computer executable instructions are provided using any computer-readable media that is accessible by computing based device 500. Computer-readable media includes, for example, computer storage media such as memory 508 and communications media. Computer storage media, such as memory 508, includes volatile and non-volatile, removable and non-removable media implemented in any method or technology for storage of information such as computer readable instructions, data structures, program modules or the like. Computer storage media includes, but is not limited to, random access memory (RAM), read only memory (ROM), erasable programmable read only memory (EPROM), electronic erasable programmable read only memory (EEPROM), flash memory or other memory technology, compact disc read only memory (CD-ROM), digital versatile disks (DVD) or other optical storage, magnetic cassettes, magnetic tape, magnetic disk storage or other magnetic storage devices, or any other non-transmission medium that is used to store information for access by a computing device. In contrast, communication media embody computer readable instructions, data structures, program modules, or the like in a modulated data signal, such as a carrier wave, or other transport mechanism. As defined herein, computer storage media does not include communication media. Therefore, a computer storage medium should not be interpreted to be a propagating signal per se. Although the computer storage media (memory 508) is shown within the computing-based device 500 it will be appreciated that the storage is, in some examples, distributed or located remotely and accessed via a network or other communication link (e.g. using communication interface 504).

The computing-based device 500 also comprises an input/output controller 506 arranged to output display information to a display device which may be separate from or integral to the computing-based device 500. The display information may provide a graphical user interface. The input/output controller 506 is also arranged to receive and process input from one or more devices, such as a user input device.

Alternatively or in addition to the other examples described herein, examples include any combination of the following clauses:

Clause A. A method performed by a controller in Kubernetes cluster, the method comprising the steps of:

identifying a job to be completed by the cluster from a plurality of jobs;

in response to identifying a job to be completed by the cluster, determining at least one sidecar container associated with the job;

in response to identifying a job to be completed by the cluster, determining that the job has been completed by querying a Kubernetes control plane of the cluster;

in response to determining that the job has been completed, triggering termination of the sidecar container.

Clause B. A method according to clause A where the controller is running in a separate pod to any of the plurality of jobs.

Clause C. A method according to any preceding clause where the job and the sidecar container are running in the same pod.

Clause D. A method according to any preceding clause where the operation of determining the sidecar container associated with the job uses a list of sidecar containers or a label on the sidecar container.

Clause E. A method according to any preceding clause where the cluster is virtualized network function, VNF, of a 5G or 6G telecommunications network.

Clause F. A method according to any preceding clause where the operation of determining the sidecar container associated with the job uses a portion of an identifier of the sidecar container.

Clause G. A method according to any preceding clause where the operation of determining the sidecar container associated with the job uses a portion of an environmental variable of the sidecar container.

Clause H. A method according to any preceding clause where the identifying of a job uses a parameter provided to the controller.

Clause I. A method according to any preceding clause where the identifying of a job uses a preconfigured label on the job.

Clause J. A method according to any preceding clause where identifying a job comprises using a portion of an identifier of the job.

Clause K. A method according to any preceding clause where the operation of identifying of a job uses a portion of an environmental variable of the job.

Clause L. A method according to any preceding clause where the termination is achieved via the controller gracefully terminating the sidecar container by triggering graceful termination on the sidecar container.

Clause M. A method according to clause L where the controller gracefully terminates the sidecar container by:

connecting to the sidecar container;

running an operating system exit command to trigger the termination of the sidecar container.

Clause N. A method according to clause L where the controller connects to the sidecar container via a network tunnel in order to terminate the sidecar container.

Clause O. A method according to any preceding clause where the controller terminates the sidecar container by using a Kubernetes API.

Clause P. A method according to any preceding clause where the controller terminates the sidecar container by performing a sequence of different termination methods, including at least one graceful method, and at least one non-graceful method.

Clause Q. A method according to any preceding clause where the accessing of an identifier of a job is done by:

determining a list of containers in the Kubernetes cluster, removing from that list sidecar containers to form a resulting list, and accessing the identifiers of jobs on the resulting list.

Clause R. A method according to any preceding clause where the controller determines the job has completed by:

connecting to a pod running on the Kubernetes cluster; and determining any non-sidecar processes running in the pod.

Clause S. A Kubernetes cluster comprising:

a control plane;

a plurality of pods, at least one of the pods comprising a container for implementing a job and a sidecar container of the job;

a controller, comprising instructions which when executed on a processor perform the operations of:

accessing an identifier of the job to be completed by the cluster from a plurality of jobs;

determining that the job has been completed by querying a control plane of the cluster;

determining the sidecar container associated with the job;

in response to determining that the job has been completed, triggering termination of the sidecar container.

Clause T. A computer-implemented method performed by a controller container in a cluster of a 5G or 6G communications network, the cluster comprised of a plurality of containers, the method comprising the operations of:

identifying a job to be completed by the cluster from a plurality of jobs;

in response to identifying a job to be completed by the cluster, determining at least one sidecar container in the cluster associated with the job;

in response to identifying a job to be completed by the cluster, determining that the job has been completed by querying a control plane of the cluster;

in response to determining that the job has been completed, triggering termination of the sidecar container.

The term 'computer' or 'computing-based device' is used herein to refer to any device with processing capability such that it executes instructions. Those skilled in the art will realize that such processing capabilities are incorporated into many different devices and therefore the terms 'computer' and 'computing-based device' each include personal computers (PCs), servers, mobile telephones (including smart phones), tablet computers, set-top boxes, media players, games consoles, personal digital assistants, wearable computers, and many other devices.

The methods described herein are performed, in some examples, by software in machine readable form on a tangible storage medium e.g. in the form of a computer program comprising computer program code means adapted to perform all the operations of one or more of the methods described herein when the program is run on a computer and where the computer program may be embodied on a computer readable medium. The software is suitable for execution on a parallel processor or a serial processor such that the method operations may be carried out in any suitable order, or simultaneously.

Those skilled in the art will realize that storage devices utilized to store program instructions are optionally distributed across a network. For example, a remote computer is able to store an example of the process described as software. A local or terminal computer is able to access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a digital signal processor (DSP), programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The operations of the methods described herein may be carried out in any suitable order, or simultaneously where appropriate. Additionally, individual blocks may be deleted from any of the methods without departing from the scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the scope of this specification.

What is claimed is:

1. A method performed by a centralized controller in a Kubernetes cluster, the centralized controller executing in a container of the Kubernetes cluster that is separate from other containers in the Kubernetes cluster that are running jobs in the Kubernetes cluster, the centralized controller communicatively coupled to a Kubernetes control plane of the Kubernetes cluster, the method comprising:
- identifying, by the centralized controller, a job to be completed by the Kubernetes cluster from a plurality of jobs running in containers in the Kubernetes cluster that are separate from the container in which the centralized controller is executing;
- in response to identifying, by the centralized controller, the job to be completed by the Kubernetes cluster:
  - determining, by the centralized controller via the Kubernetes control plane, a sidecar container associated with the job; and
  - determining, by the centralized controller, that the job has been completed based on job completion status reported by the Kubernetes control plane independently of execution state of the sidecar container; and
- in response to determining that the job has been completed while the sidecar container remains running, triggering, by the centralized controller, termination of the sidecar container to allow the Kubernetes cluster to recognize completion of the job.

2. The method according to claim 1, wherein the controller is running in a pod that is separate from any of the plurality of jobs.

3. The method according to claim 1, wherein the job and the sidecar container are running in the same pod.

4. The method according to claim 1, wherein determining the sidecar container associated with the job comprises using a list of sidecar containers or a label on the sidecar container.

5. The method according to claim 1, wherein the Kubernetes cluster is a virtualized network function (VNF) of a 5G or 6G telecommunications network.

6. The method according to claim 1, wherein determining the sidecar container associated with the job comprising using a portion of an identifier of the sidecar container.

7. The method according to claim 1, wherein determining the sidecar container associated with the job comprises using a portion of an environmental variable of the sidecar container.

8. The method according to claim 1, wherein the job is identified using a parameter provided to the controller.

9. The method according to claim 1, wherein the job is identified using a preconfigured label on the job.

10. The method according to claim 1, wherein the job is identified using a portion of an identifier of the job.

11. The method according to claim 1, wherein the job is identified using a portion of an environmental variable of the job.

12. The method according to claim 1, wherein the termination is achieved via the controller gracefully terminating the sidecar container by triggering graceful termination on the sidecar container.

13. The method according to claim 12, wherein the controller gracefully terminates the sidecar container by:
- connecting to the sidecar container; and
- running an operating system exit command to trigger the termination of the sidecar container.

14. The method according to claim 12, wherein the controller connects to the sidecar container via a network tunnel in order to terminate the sidecar container.

15. The method according to claim 1, wherein the controller terminates the sidecar container by using a Kubernetes API.

16. The method according to claim 1, wherein the controller terminates the sidecar container by performing a sequence of different termination methods, including at least one graceful method, and at least one non-graceful method.

17. The method according to claim 10, wherein the identifier of the job is accessed by:
- determining a list of containers in the Kubernetes cluster,
- removing, from the list, sidecar containers to form a resulting list, and
- accessing identifiers of jobs on the resulting list.

18. The method according to claim 1, wherein the controller determines that the job has completed by:
- connecting to a pod running on the Kubernetes cluster; and
- determining any non-sidecar processes running in the pod.

19. A system comprising a plurality of networked computers executing a Kubernetes cluster comprising:
- a control plane;
- a plurality of pods, at least one of the pods comprising a first container for implementing a job and a sidecar container of the job; and
- a centralized controller, the centralized controller executing in a second container of the Kubernetes cluster that is separate from other containers in the Kubernetes cluster that are running jobs in the Kubernetes cluster, the centralized controller communicatively coupled to the control plane, the centralized controller configured to perform operations comprising:
  - accessing an identifier of a job to be completed by the Kubernetes cluster from a plurality of jobs;
  - determining that the job has been completed based on job completion status reported by the control plane independently of execution state of the sidecar container by;
  - determining, via the control plane, the sidecar container associated with the job; and
  - in response to determining, while the sidecar container remains running, that the job has been completed, triggering termination of the sidecar container to allow the Kubernetes cluster to recognize completion of the job.

20. A computer-implemented method performed by a centralized controller container executing in a cluster of a 5G or 6G communications network comprising a plurality of computers, the cluster comprising a plurality of containers, wherein the cluster is separate from other containers in the cluster that are running jobs in the cluster, the centralized controller container communicatively coupled to a control plane of the cluster, the method comprising:
- identifying, by the centralized controller container, a job to be completed by the cluster from a plurality of jobs;
- in response to identifying the job to be completed by the cluster:
  - determining, by the centralized controller container via the control plane, a sidecar container in the cluster associated with the job; and
  - determining, by the centralized controller container, that the job has been completed based on job completion status reported by the control plane independently of execution state of the sidecar container; and in response to determining, while the sidecar container remains running, that the job has been completed, triggering, by the centralized controller container, termination of the sidecar container to allow the cluster to recognize completion of the job.

* * * * *